United States Patent [19]

Biberger

[11] 4,161,096

[45] Jul. 17, 1979

[54] BLADE ARRANGEMENT FOR A MOTOR DRIVEN SICKLE OR ROTARY MOWING MACHINES, AND SUCH MACHINES

[76] Inventor: Hans Biberger, Landshuter Strasse 4, 8301 Ergolding-Landshut, Fed. Rep. of Germany

[21] Appl. No.: 744,047

[22] Filed: Nov. 22, 1976

[30] Foreign Application Priority Date

Aug. 8, 1976 [DE] Fed. Rep. of Germany ....... 2635807

[51] Int. Cl.² ............................................. A01D 55/18
[52] U.S. Cl. ..................................... 56/12.9; 56/13.4; 56/295
[58] Field of Search ............. 56/13.4, 295, 202, 320.2, 56/255, 503, 12.9

[56] References Cited

U.S. PATENT DOCUMENTS

| | | | |
|---|---|---|---|
| 2,777,270 | 1/1957 | Colclazier | 56/13.4 |
| 2,779,146 | 1/1957 | Mitchell et al. | 56/13.4 |
| 2,796,714 | 6/1957 | Denney | 56/12.9 |
| 2,877,616 | 3/1959 | Gewalt et al. | 56/13.4 |
| 2,888,796 | 6/1959 | Denney | 56/13.4 |
| 2,953,888 | 9/1960 | Phillips, Jr. et al. | 56/13.4 |
| 3,690,051 | 9/1972 | Wood | 56/295 |
| 3,905,181 | 9/1975 | Messner | 56/13.4 |

*Primary Examiner*—Jay N. Eskovitz
*Attorney, Agent, or Firm*—Cushman, Darby & Cushman

[57] ABSTRACT

The disclosure embraces an improved blade arrangement for a power mower which includes four blade arms mounted on a shaft together with a curved plate which is mounted on the same shaft a selected perpendicular distance from the blades; air deflection surfaces are provided both on the trailing edge of each of the blades as well as on the plate so that, when in use, the resulting noise produced by the rotating blades will be reduced.

11 Claims, 2 Drawing Figures

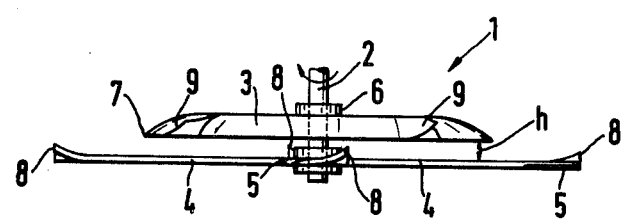
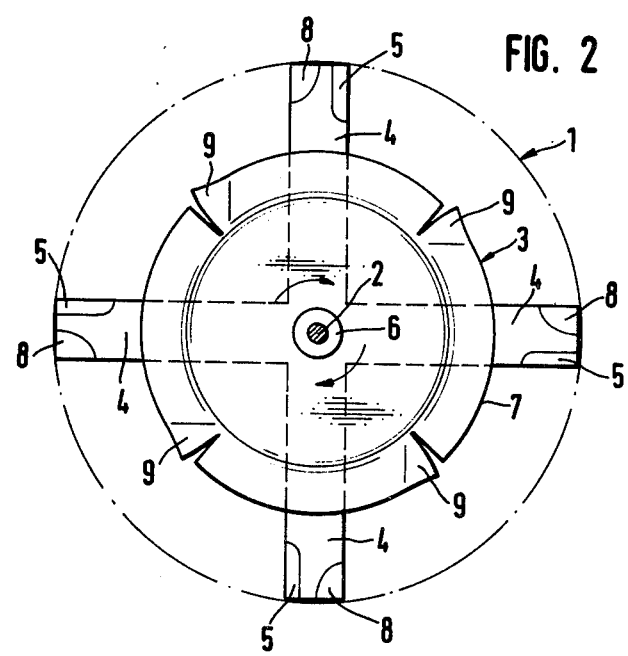

BLADE ARRANGEMENT FOR A MOTOR DRIVEN SICKLE OR ROTARY MOWING MACHINES, AND SUCH MACHINES

The invention relates to a blade arrangement for a motor driven sickle or rotary mowing machines such as lawn mowers, with provision of ejection of grass into a grass collecting container of the machine. The invention also relates to machines including such blade arrangements. Sickle lawn-mowers are driven either by an electric motor or a small internal combustion engine. Since, in particular with the driving of such mowers by means of an internal combustion engine such as a 2-stroke engine or a 4-stroke engine, a considerable amount of noise is developed, for a long time attempts have been made to make such lawn mowers quieter; for example, for this purpose the engine is boxed in.

It has however been proved that with the normal speed of about 3600 revs. per minute, the noise of the blades is also very loud and even after slight damping of the noise of the engine, blade noise can exceed the noise of the engine. This is in particular the case with lawn-mowers having provision for ejection of the cut grass into a grass collecting container because in such machines there are provided on the rotating shaft some air deflecting elements. These are usually defined by a corresponding bending up of the rear edges of the blade arms so that blade arms act, at the same time as the cutting means, as a fan and convey the cut grass in an air stream into the grass collecting container. This gives rise to loud air noises which are attributed to local abrupt compressed air pressure fluctuations which arise due to the running of the air deflecting member past the side boundaries of the grass ejection opening of the housing or at other irregularly formed parts of the housing.

An attempt has been made to reduce this noise as well as the engine noise by reduction of the speed of the blade shaft. However, in doing this, very quickly a position is reached at which there is insufficient ventilation action of the air deflection elements to give effective discharge of the cut grass.

Besides the tongue characteristic of the engine just below the optimum speed drops very much so that with the drop in speed the blade arms in particular in long grass, may become stuck to such an extent to stall the engine or in any case are braked to such an extent that the speed necessary for the ejection of grass is not achieved, which leads to break-downs.

Thus, narrow limits are set for the noise damping on conventional sickle lawn mowers of the type having a single elongated member mounted by its central region on the blade shaft to define two blade arms with cutting edges and air deflecting members at the ends thereof. The invention, at least in its preferred form, seeks to provide a blade arrangement which gives satisfactory cutting and good filling of the grass collecting container and yet provides a distinct reduction of the noise level.

According to the invention there is provided a blade arrangement for a motor driven sickle or rotary mowing machine adapted for ejection of cut grass into a grass collecting container, comprising a rotatable blade shaft a substantially circular plate fixed on the shaft, blade arms extending radially of the shaft which have blade cutting edges spaced axially of the shaft and extending radially outside the substantially circular periphery of the plate, and a plurality of air deflecting members on the blade arms and/or the plate are distributed substantially uniformly peripherally of the blade arrangement.

Experiments with such a blade arrangement in its preferred form have shown that by the use thereof the noise level is capable of being lowered by several decibels as far as a range of about 68dbA. This noise reduction results mainly from a substantial verifying of the local conveying pressure of the air at the periphery of the blade arrangement. The plate itself produces upon its rotation no local compressed air fluctuations as the circular peripheral edge exercises no conveying action on the air. Small local compressed air fluctuations may be produced, apart from the air deflecting elements, from the blade knives which however lie with the blade cutting edges spaced apart from the peripheral edge of the disc so that also as there is no appreciable flow charge effects between the disc and the blade arms. The air deflection members themselves are distributed in a large number uniformly on the periphery of the blade arrangement so that for achieving a desired conveying effect at a given speed, a lesser acceleration of the air can take place on each air deflection element thus, the air current already quite a few centimeters downstream of each of the deflection members is substantially unified. Therefore, at contractions or widened portions of the periphery of the housing there are only small local air pressure fluctuations and pressure shocks which in all reduces substantially the development of noise upon rotation of the blade arrangement in the housing.

In a preferred development, the blade shaft has at least four blade arms distributed uniformly peripherally on the blade arrangement. Due to the increase of the numbers of the cutting edges, the specific required cutting capacity of each cutting edge decreases. Thereby, even with engines constructed for operating at higher speed a reduction in speed can take place without difficulty and without thereby decreasing the cutting capacity of the blade arrangement in long grass. Due to such a reduction, the noise level of the engine as well as also that of the blade arrangement drops. The required total converging capacity of the air deflection for achieving a satisfactory filing of the grass collecting container can be achieved without difficulties by using a greater number of air deflection members which means a corresponding reduction in the use of each air deflection member, so that even at slower speeds the desired conveying capacity can be maintained without problem.

The blade arms are preferably fixed below the plate directly to the blade shaft. Thereby, flow technological charge effects between the blade arms and the plate, which can act disadvantageously on the development of noise, are substantially excluded, compared with the case in which the blade arms are fixed on the plate itself in the region of the peripheral edge thereof.

Each blade arm suitably has in known manner an air deflection member so that on the plate itself only the air deflection members additionally necessary for the uniform distribution of a larger number of air deflection members must be provided. All of the air deflection members present are disposed with special advantage in at least two radial distances from the blades shaft whereby suitably a first ring of air deflection members in the region of the blade cutting edges is provided and a second ring in the region of the peripheral edge of the plate is provided. This means also radial distribution of the air deflection member elements, which if necessary could also be added to be an inner ring of air deflection member on the upper side of the plate, a further unifying of the air current can be achieved as then the air deflection member elements are distributed only over the periphery of the blade arrangement but also radially of the blade arrangement. In this case in each radial distance it is preferred to provide at least four air deflection members whilst it is preferred in every case that there should be at least six air deflection members for a sufficient uniformity of the air flow.

Particularly satisfactory results have been shown when the peripheral edge of the plate is bent dish shaped downwards in the direction of the blade arms.

Particularly satisfactory results can be achieved when the diameter of the plate amounts to about two thirds of the diameter of the swept area of the blade arms so that in the case of an arrangement of air deflection members at the tips of the blade arms as well as also on the periphery of the plate, there is a suitable radial distance spacing the two rings of air deflection members.

The vertical distance of the blade cutting edges, which are connected preferably to the air deflecting members, to the peripheral edge of the plate has proved to be an important measurement. This distance for achieving a particularly intensive noise reduction is between 10mm and 40mm with quite special advantage however between 20 to 25 mm.

The air deflecting members themselves may be formed by sheet metal projections or the like welded on or attached to the upper side of the plate and/or blade arms. A particularly simple manufacture of the air deflecting members follows however when these are formed by bends at an angle on edges of the blade arms and/or the plate as is known per se for the blade arms.

The member also provides a motor driven sickle or rotary mowing machine having a blade arrangement as aforesaid.

Further details, features and advantages of the invention follow from the following description of one embodiment with reference to the drawing wherein:

FIG. 1 shows a side view of the blade arrangement; and

FIG. 2 shows a plan view of the blade arrangement shown in FIG. 1.

In the drawing, the blade arrangement is indicated by numeral 1 and it includes a blade shaft 2. The blade shaft 2 is in known manner driven by an engine, for example, by an internal combustion engine of the lawn mower, and passes from the engine down through a protective housing, not shown, surrounding, the blade arrangement. On the blade shaft 2 are fixed a horizontal plate 3 and, under the plate 3, the actual cutting tools formed as blade arms 4. The blade arms 4 are provided on their outer ends in the direction in which they rotate in use as shown by arrows in both figures, with blade cutting edges 5, as is usual in sickle or rotary lawn mowers.

The horizontal plate 3 is fixed via a clamping sleeve 6 or the like on the blade shaft 2, whilst the blade arms 4, arranged in pairs to define a cross-shape, are welded together where the pairs cross and are fixed, separate from the plate 3, on to the blade shaft 2 by suitable fixing members. The blade arms 4 and the plate 3 are thus fixed separately on the blade shaft 2 but they rotate together, with the blade shaft 2, in two horizontal planes lying above one another.

As can be seen directly from the drawing, the blade arms 4 project beyond the peripheral edge 7 of the horizontal plate 3. The plate 3 is dished in that the peripheral edge 7 of the horizontal plate 3 is bent downwards in the manner shown. The diameter of the plate 3 is in the order of magnitude of about two thirds of the diameter of area swept by the blade arms 4. At the outer ends of each of the blade arms 4 opposite to the blade cutting edge 5 are provided in known manner angled portions, which form the air deflecting members 8. In use, these air deflecting members 8 produce in the housing, taking into consideration the direction of rotation (the arrows shown) of the blade arrangement 1, deflection of air substantially upwards and rearwards also radially outwards directed air flow so that the grass cut by the mower is delivered by a strong air current to a grass ejection opening of the housing and into a grass collecting container such as a grass collecting bag removably attached to the housing. These air currents inside the housing produce in known lawn mowers which have only two blade arms 4 lying diammetrically opposite and provided with suitable air deflecting members 8, loud noises which, even with internal combustion engines, can even exceed the noise of the engine.

On the horizontal plate 3 are provided further air deflecting members 9 which are also formed as angled portions of the peripheral edge 7 made by slitting or pressing or other suitable procedure. Instead of this arrangement, sheet metal lugs or the like may be welded on the plate 3 to produce an air flow directed upwards and, if necessary, outwards.

The air deflecting members 9 are angularly staggered in relation to the air deflecting members 8 on the blade arms 4 so that in all there are eight air deflecting members 8 and 9 respectively which are distributed angularly uniformly peripherally of the blade arrangement. The air deflecting members 8 and 9 act at different radial distances, as the air deflecting members 8 lie on the blade arms 4 where they lie radially outwards to the plate 3 whilst the air defecting members 9 lie on the peripheral edge 7 of the plate 3. Due to this more uniform distribution of the air deflecting members in peripheral direction as well as also in radial direction, there results from this blade arrangement a more uniform fan effect which is substantially free of local pressure fluctuations during the rotation of the members of the blade arrangement 1 past the inner wall of the housing. Thereby compared to conventional mowers, a substantial lowering of the noise level is achieved. Furthermore, by providing four rotating blade cutting edges 5 the speed of the engine may also be substantially reduced without increasing the required specific cutting capacity of each blade cutting edge 5 to achieve the same cutting condition as a conventional machine. With a lowering of the speed, not only is the engine noise reduced, which may mean that the covering for the engine which is expensive and liable to cause trouble can be dispensed with, but the noise produced in the region of the blade arrangement 1 are also reduced. In spite of the lower speed, a sufficient air supply capacity for a satisfactory filing of the grass collecting container can be achieved without difficulties because of the use of the plurality of air deflecting members 8 and 9, as these can be employed as required without problem. Furthermore, the arrangement shown can be modified by increasing the members of air deflecting members 8 and 9 respectively in case of need; for example, the numbers of air deflecting members 9 on the peripheral edge 7 of the plate 3 could be increased to provide, two air deflecting members 9 between each two angularly adjacent air deflecting members 8 on the blade arms 4 and/or additional air deflecting members could be provided in a manner, not shown, radially further inwards on the upper side of the plate 3. Care should be taken however that the air deflecting members 8 and 9 respectively are all distributed as uniformly as possible radially and peripherally of the blade arrangement 1 as small deviations from a uniform distribution could affect the machine efficiency in the case of additional deflecting members lying radially far inwards of the blade arrangement. Of Of essential significance for the reduction of noise is keeping the blades spaced from the plate, shown as the distance between the plane of the blade arms 4 and the peripheral edge 7 of the plate 3 (see FIG. 1). This distance is of some importance, as if it less than a distance of about 10 mm and/or more than a distance of about 40 mm, a distinct increase of the noise development shows. In the form selected for the embodiment, a distance in the order of magnitude of 20 to 25 mm has given good results and it is expected that this distance would give good results in the modified embodiments. If the blade arms 4, deviating from the embodiment shown, are not fixed directly on the blade shaft 2 but are fixed on the region of the peripheral edge 8 of the plate 3, a distance h the difference in height between the horizontal plane of the peripheral edge 7 and the upper side of the horizontal cutting blade 5 is to be taken.

With a lawn mower according to the invention, excellent mowing results have already been achieved at speeds of far under 3000 revs per min, and the level of noise is reduced to under 68 dbA.

What I claim is:

1. A blade arrangement for a motor driven sickle or rotary mowing machine adapted for ejection of cut grass into a grass collecting container, comprising a rotatable blade shaft, a substantially circular plate fixed on said shaft, blade arms extending radially of said shaft, said blade arms being spaced along said shaft a selected distance from said circular plate, said circular plate having a concave surface facing along said shaft in the direction of said blade arms, said selected distance and said concave surface being such that the noise produced by the operation of said blade arrangement is reduced, said blade arms extending radially of said shaft, said blade arms having blade cutting edges thereon spaced from said shaft and extending radially outwardly of the periphery of said substantially circular plate, a plurality of air deflecting members on said blade arms and on said plate distributed substantially uniformly peripherally relative to said shaft each said air deflecting member on each said blade arm being disposed radially outwardly of said periphery of said circular plate.

2. A blade arrangement according to claim 1, wherein the blade shaft has at least four blade arms distributed substantially uniformly peripherally of said shaft.

3. A blade arrangement according to claim 1, wherein the blade arms are secured directly against the blade shaft and spaced from the plate.

4. A blade arrangement according to claim 1, wherein said plate is dished and the peripheral edge of the plate is bent towards the blade arms.

5. A blade arrangement according to claim 1, wherein the diameter of the plate is approximately two thirds of the diameter of the swept area of the blade arms.

6. A blade arrangement according to claim 1, wherein the vertical distance between the blade cutting edges and the peripheral edge of the plate is between 10 mm and 40 mm.

7. A blade arrangement according to claim 1, wherein air deflecting members include sheet metal lugs fastened to the upper side of the plate and of the blade arms.

8. A blade arrangement according to claim 1, wherein the air deflecting members include portions bent at an angle on edges of the blade arms and of the plate.

9. A blade arrangement as claimed in claim 1 wherein said air deflecting members are disposed each adjacent the outer periphery of each said blade arm.

10. The blade arrangement as claimed in claim 1 wherein four blade arms are provided, each having an outer edge and an air deflecting member located at said outer edge.

11. The blade arrangement as claimed in claim 1 wherein the vertical distance between the blade cutting edges and the peripheral edge of said blade is between 20-25mm.

* * * * *